(12) United States Patent  (10) Patent No.: US 6,745,990 B2
Groff et al.  (45) Date of Patent: Jun. 8, 2004

(54) ANCHOR DEVICE

(75) Inventors: Malcolm K. Groff, Orwigsburg, PA (US); Yeu-Tien Yu, Taipei (TW)

(73) Assignee: LTL Home Products, Inc., Schuylkill Haven, PA (US)

( * ) Notice: Subject to any disclaimer, the term of this patent is extended or adjusted under 35 U.S.C. 154(b) by 0 days.

(21) Appl. No.: 10/138,613

(22) Filed: May 3, 2002

(65) Prior Publication Data

US 2002/0124489 A1 Sep. 12, 2002

Related U.S. Application Data

(62) Division of application No. 09/374,542, filed on Aug. 16, 1999, now Pat. No. 6,402,115.

(51) Int. Cl.[7] .................................................. E02D 5/00
(52) U.S. Cl. .................... 248/508; 248/530; 248/156
(58) Field of Search ................................. 748/508, 530, 748/156; 52/165, 155, 156; 47/386, 387, 401

(56) References Cited

U.S. PATENT DOCUMENTS

| | | | |
|---|---|---|---|
| 383,296 A | * 5/1888 | Husselman | 256/32 |
| 573,508 A | 12/1896 | Ferris | |
| 29,550 A | 10/1898 | Patterson | |
| 850,773 A | 4/1907 | Miner | |
| 1,438,074 A | 12/1922 | Welch | |
| 3,079,158 A | 2/1963 | Finn et al. | |
| 3,531,090 A | * 9/1970 | Laible | 256/10 |
| 3,645,537 A | 2/1972 | Parenteau | |
| 4,271,646 A | 6/1981 | Mills | |
| 4,324,388 A | * 4/1982 | Klaser | 256/19 |
| 4,581,806 A | 4/1986 | Minoshima | |
| 4,582,257 A | * 4/1986 | Siegler | 239/197 |
| 4,588,157 A | 5/1986 | Mills | |
| 4,874,149 A | 10/1989 | Miceli | |
| 4,939,877 A | * 7/1990 | Claffey | 52/155 |
| 5,148,641 A | 9/1992 | Rushing et al. | |
| 5,158,231 A | 10/1992 | Christen et al. | |
| 5,222,703 A | 6/1993 | Ricciardelli | |
| 5,365,689 A | 11/1994 | Holliman | |
| 6,274,074 B1 | 8/2001 | Monie | |

* cited by examiner

Primary Examiner—Alvin Chin-Shue
(74) Attorney, Agent, or Firm—Vople and Koenig, P.C.

(57) ABSTRACT

An anchor device comprising an elongated insert which has a lower end, an upper end, and a plurality of rib members extending radially therefrom, each of said rib members having a radial width which increases gradually in a direction from said lower end to said upper end of said elongated insert; an attachment seat integrally connected to said upper end of said insert and upper edges of said rib members; a metal shaft embedded longitudinally in said elongated insert, said metal shaft having an upper end which is embedded in said attachment seat, and a lower end which extends out of said lower end of said insert; and wherein said lower end of said metal shaft is tapered.

11 Claims, 17 Drawing Sheets

US 6,745,990 B2

ANCHOR DEVICE

CROSS-REFERENCE TO RELATED APPLICATIONS

This application is a divisional of U.S. patent application Ser. No. 09/374,542, filed on Aug. 16, 1999 now U.S. Pat. No. 6,402,115, which application is incorporated herein by reference.

FIELD OF THE INVENTION

This invention relates to a method for manufacturing an anchor device and the product thereof, more particularly to a method for manufacturing an anchor device having an insert with a plurality of rib members extending radially therefrom and an attachment seat integrally formed on an upper end of the insert.

BACKGROUND OF THE INVENTION

Referring to FIG. 1, a conventional anchor device 1 is shown to comprise an insert 11 and a clamping seat 10 connected to an upper end of the insert 11. The insert 11 is adapted to be rammed into the ground 2 while the clamping seat 10 is exposed from the ground 2. A mounting post 4, for example, of a mailbox 3 is inserted into and is clamped by the clamping seat 10 in order to be supported above the ground 2. The conventional anchor device 1 is made of a zinc-plated metal material and is manufactured according to the following steps:

(1) Forming a trapezoidal first zinc-plated metal plate (A1) by means of a cutting process, as shown in FIG. 2(a).

(2) Bending the first zinc-plated metal plate (A1) along its centerline to form an angled plate, as shown in FIG. 2(b).

(3) Welding together the bent portions of two angled plates (A1) of FIG. 2(b) at a few points (B) in order to form a cross-shaped member with four ribs (A3), as shown in FIG. 2(c).

(4) Forming an elongated second zinc-plated metal plate (A2), as shown in FIG. 2(d).

(5) Bending the second zinc-plated metal plate (A2) into a clamping seat 10 with four connecting portions 100, as best illustrated in FIG. 2(e).

(6) Welding the edges of the rib members (A3) on the connecting portions 100 of the clamping seat 10 at points (B) in order to form the conventional anchor device 1, as best illustrated in FIG. 2(f).

The conventional anchor device 1 suffers from the following disadvantages:

1. The zinc-plated metal plate is expensive. Therefore, the manufacturing cost of the conventional anchor device 1 is relatively high.

2. The manufacturing process of the conventional anchor device 1 is very complicated.

3. The welding points (B) are liable to corrode due to weather factors, thereby resulting in eventual separation of the components of the conventional anchor device 1.

Therefore, the conventional anchor device 1 has a relatively short service life.

SUMMARY OF THE INVENTION

The object of the present invention is to provide a method for manufacturing an anchor device which can be manufactured at a relatively low cost and which has a good weather resistance and a relatively long service life, as well as to provide the product thereof.

According to one aspect of the present invention, an anchor device having an elongated insert with a plurality of rib members extending radially therefrom may be manufactured according to the following method:

(a) providing an elongated mold having an axial hole formed along a longitudinal axis thereof, a plurality of grooves extending radially from the axial hole, each of the grooves having a radial width which increases gradually in a direction from a first end to a second end of the axial hole, and a enlarged receiving space formed adjacent to the second end of the axial hole;

(b) disposing a metal shaft such as an metal shaft having a tapered end and a head end in the axial hole of the mold so that the head end of the metal shaft extends into the receiving space of the mold; and (c) injecting a molten plastic material into the mold around the metal shaft in order to fill the grooves and the receiving space so as to form the insert of the anchor device.

In one embodiment the attachment seat is an open box that can receive, for example, a pole, and can clamp the pole in place (i.e., a clamping seat). According to one aspect of the present invention, the clamping seat may be manufactured at an upper end of the anchor device according to the following method:

(a) same as above
(b) same as above
(c) same as above
(d) moving a forming die into the receiving space of the mold to depress the plastic material in the receiving space so as to form an open area surrounded by sidewalls;
(e) retracting the forming die from the mold; and
(f) removing the integrally formed anchor device from the mold.

In another embodiment the attachment seat may be a block preferably with a hole there through for attaching, for example, a rope (i.e., an anchoring seat). According to one aspect of the present invention, the anchoring seat may be manufactured at an upper end of the anchor device according to the following method:

(a) same as above
(b) same as above
(c) same as above
(d) moving a forming die into the receiving space of the mold to depress the plastic material in the receiving space so as to form a block with a hole therethrough;
(e) retracting the forming die from the mold; and
(f) removing the integrally formed anchor device from the mold.

According to another aspect of the present invention, the anchoring seat may be manufactured at an upper end of the anchor device according to the following method:

(a) same as above
(b) disposing a metal shaft having a tapered end and a head end in the axial hole of the mold so that the head end of the metal shaft extends into the receiving space of the mold, the head end including a block with a hole therethrough on top of a circular head;
(c) injecting a molten plastic material into the mold around the metal shaft in order to fill the grooves and the receiving space so as to form the insert of the anchor device and coat the circular head and the block;

(d) removing the integrally formed anchor device from the mold.

According to one embodiment of the present invention, an anchor device comprises:

(a) an elongated insert which is made of a plastic material and which has upper and lower ends, and a plurality of rib members extending radially therefrom, each of the rib members having a radial width which increases gradually in a direction from the lower end to the upper end of the insert;

(b) an attachment seat which is made of a plastic material and which is integrally connected to the upper end of the insert and upper edges of the rib members; and (c) a metal shaft embedded longitudinally in the insert, the metal shaft having an upper end which extends into the attachment seat, and a lower end which extends out of the lower end of the insert.

According to another embodiment of the invention, the attachment seat is a clamping seat that includes an opening surrounded by sidewalls that can be clamped together.

According to another embodiment, the attachment seat may be an anchoring seat that includes a block with a hole therein. The block may be plastic or may be metal (e.g., an extension of the metal shaft) coated in plastic.

BRIEF DESCRIPTION OF THE DRAWINGS

Other features and advantages of this invention will become apparent in the following detailed description of the preferred embodiments of this invention with reference to the accompanying drawings, in which.

DETAILED DESCRIPTION OF THE PREFERRED EMBODIMENT(S)

Figure 1:
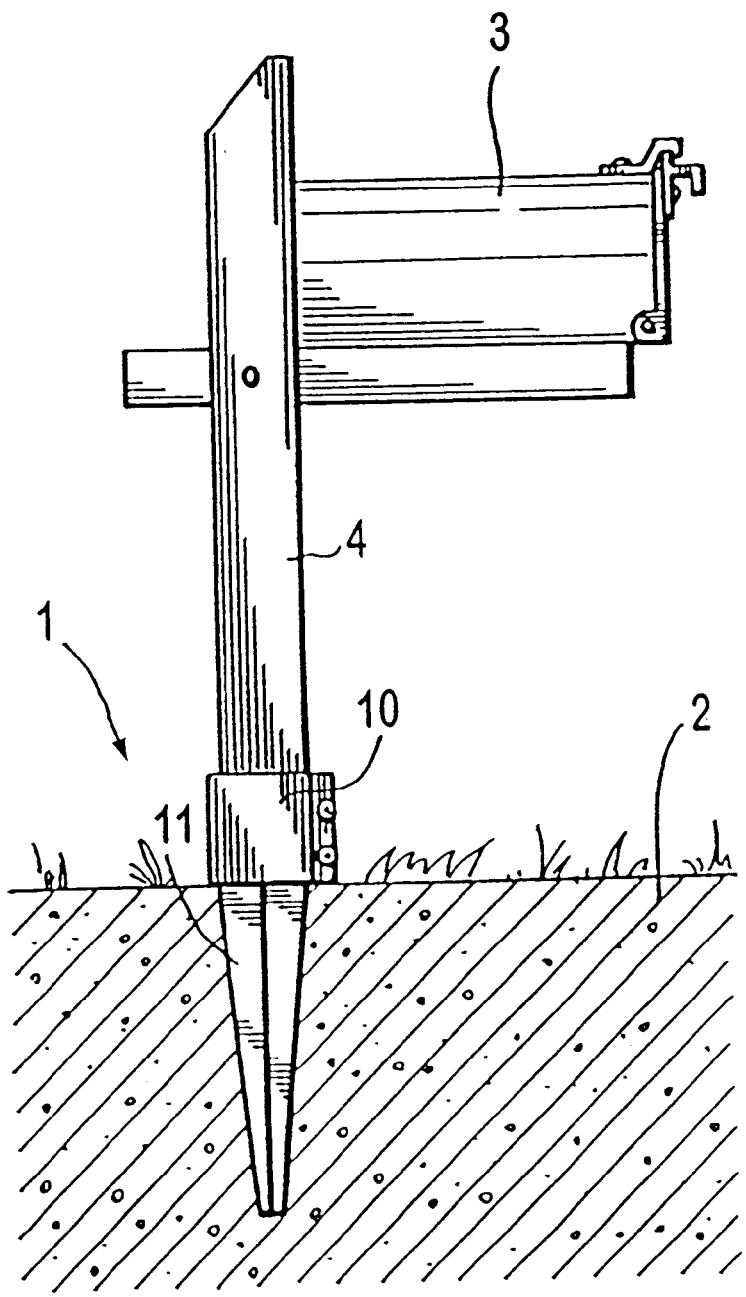
FIG. 1 is a schematic view illustrating how a conventional anchor device is used to support the mounting post of a mailbox.
Figure 2A:
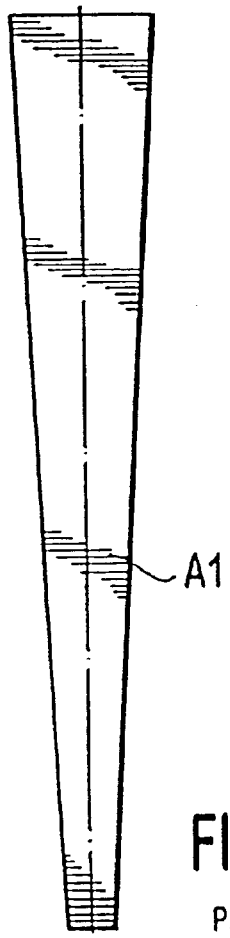
FIGS. 2(a)–2(f) are schematic views illustrating the manufacturing process of the conventional anchor device.
Figure 2B:
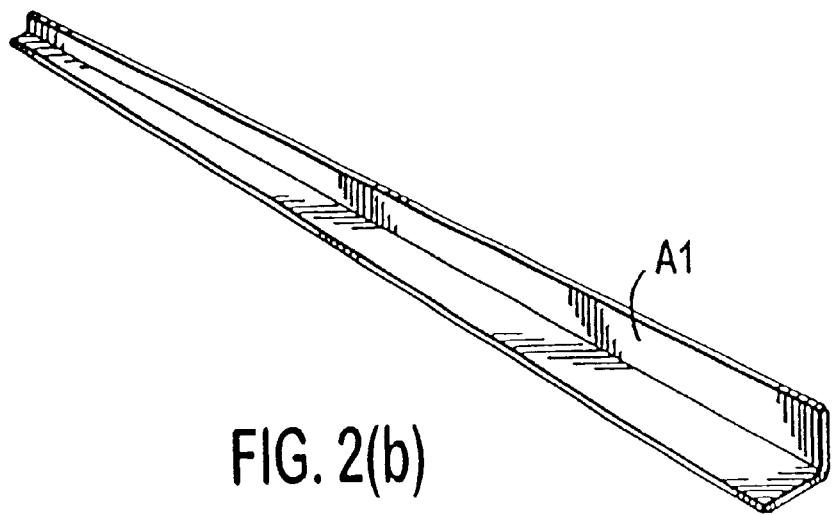
Figure 2C:
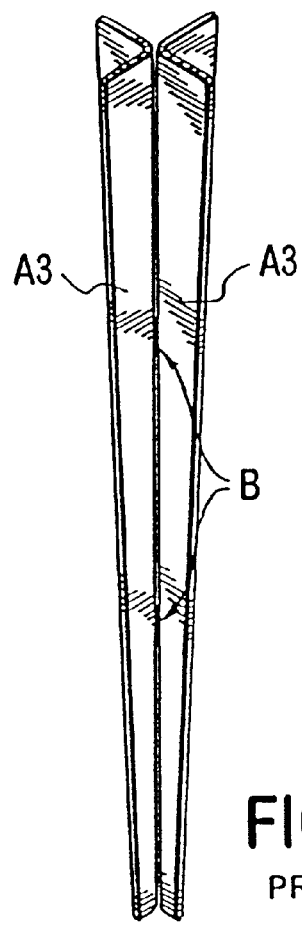
Figure 2D:
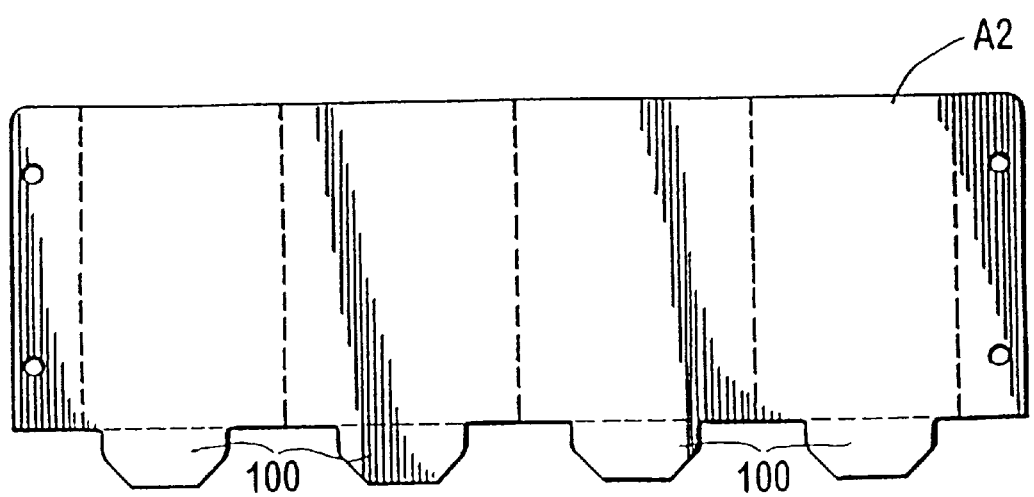
Figure 2E:
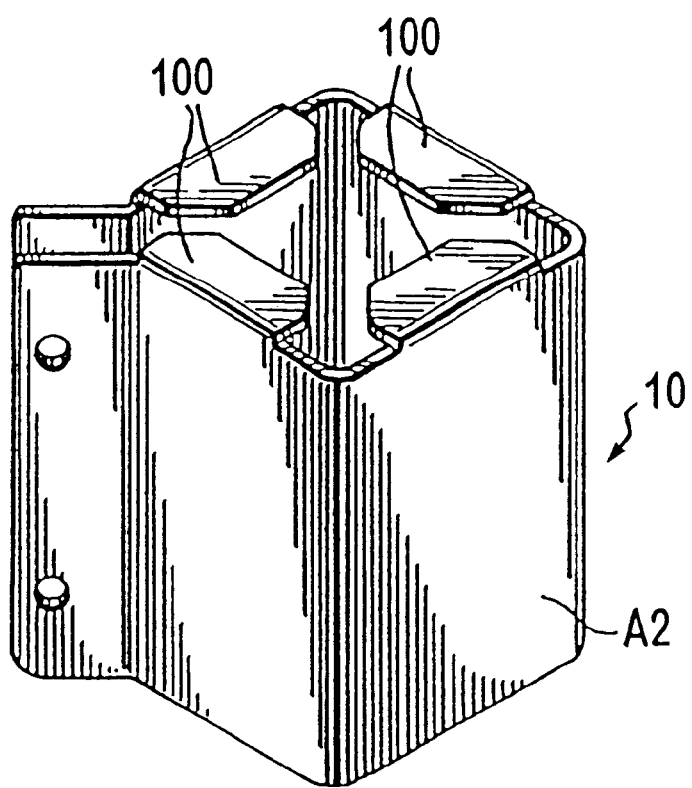
Figure 2F:
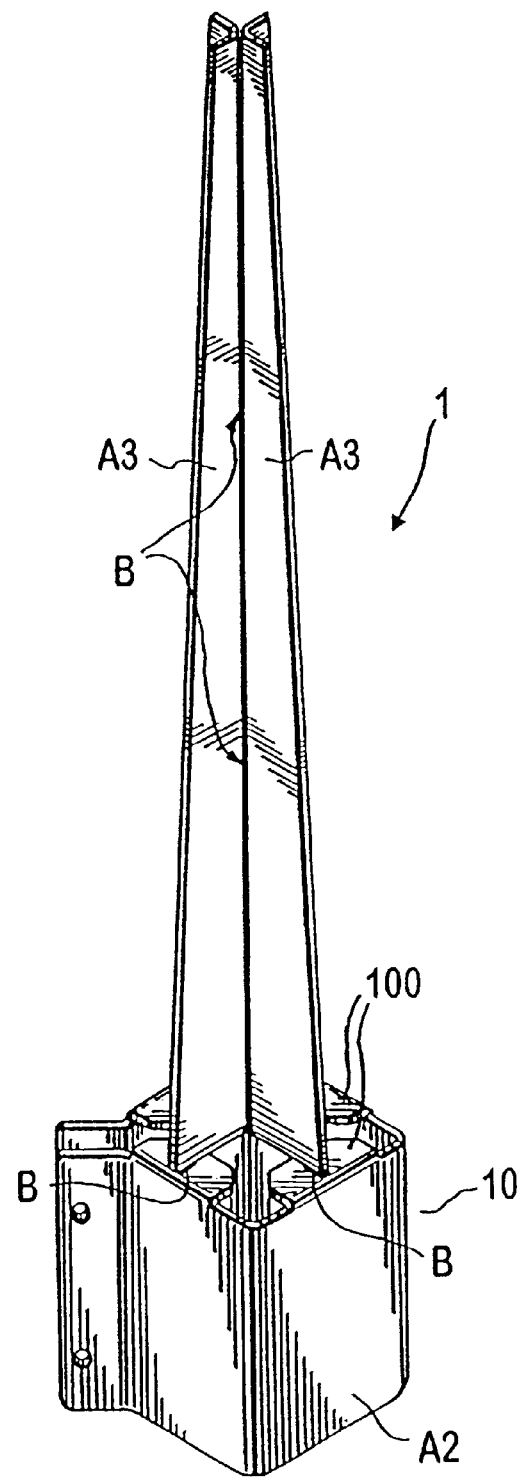
Figure 3:
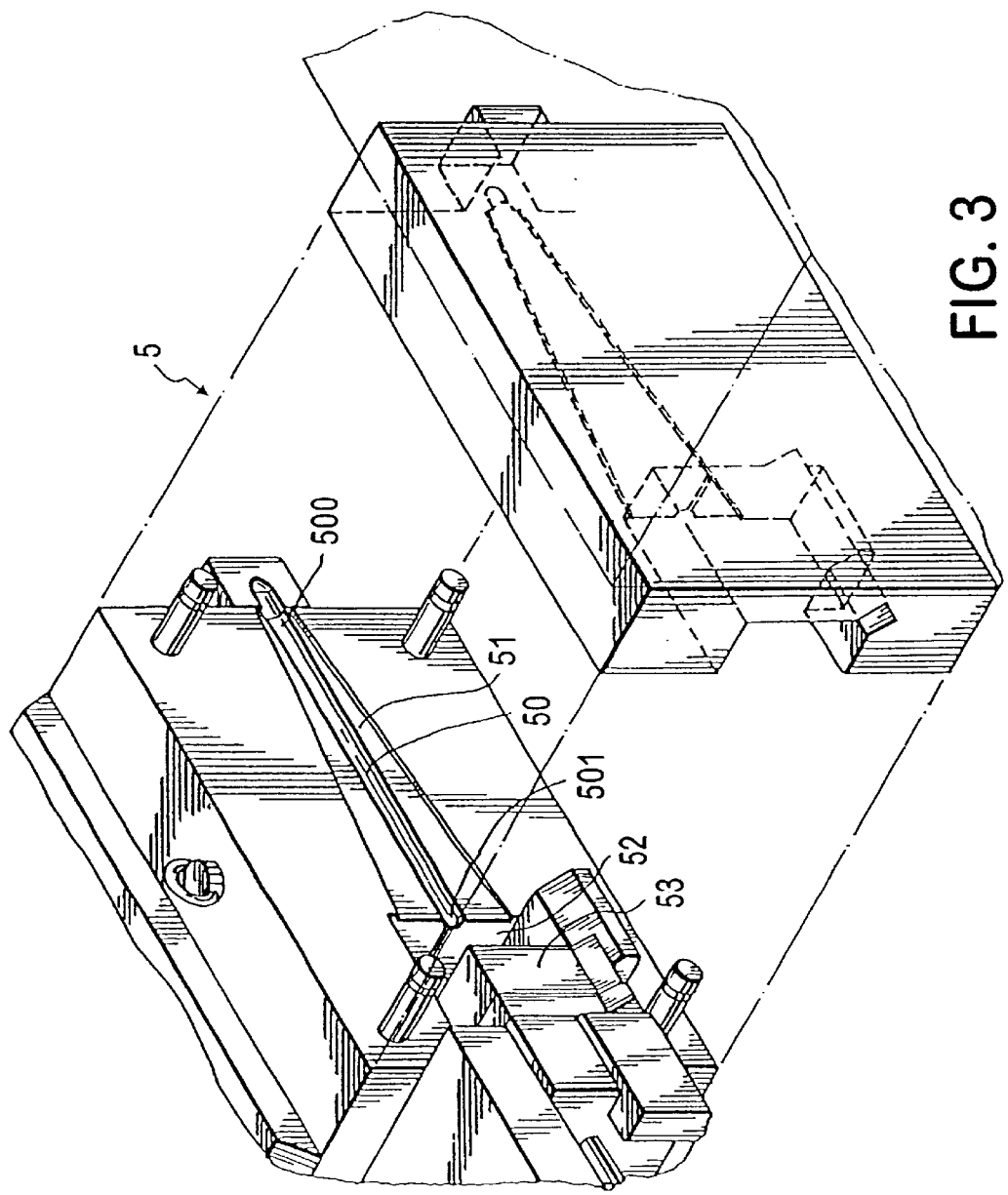
FIG. 3 is a fragmentary, exploded schematic view illustrating an elongated mold for manufacturing one embodiment of an anchor device having a clamping seat according to a method of the present invention.
Figure 4:
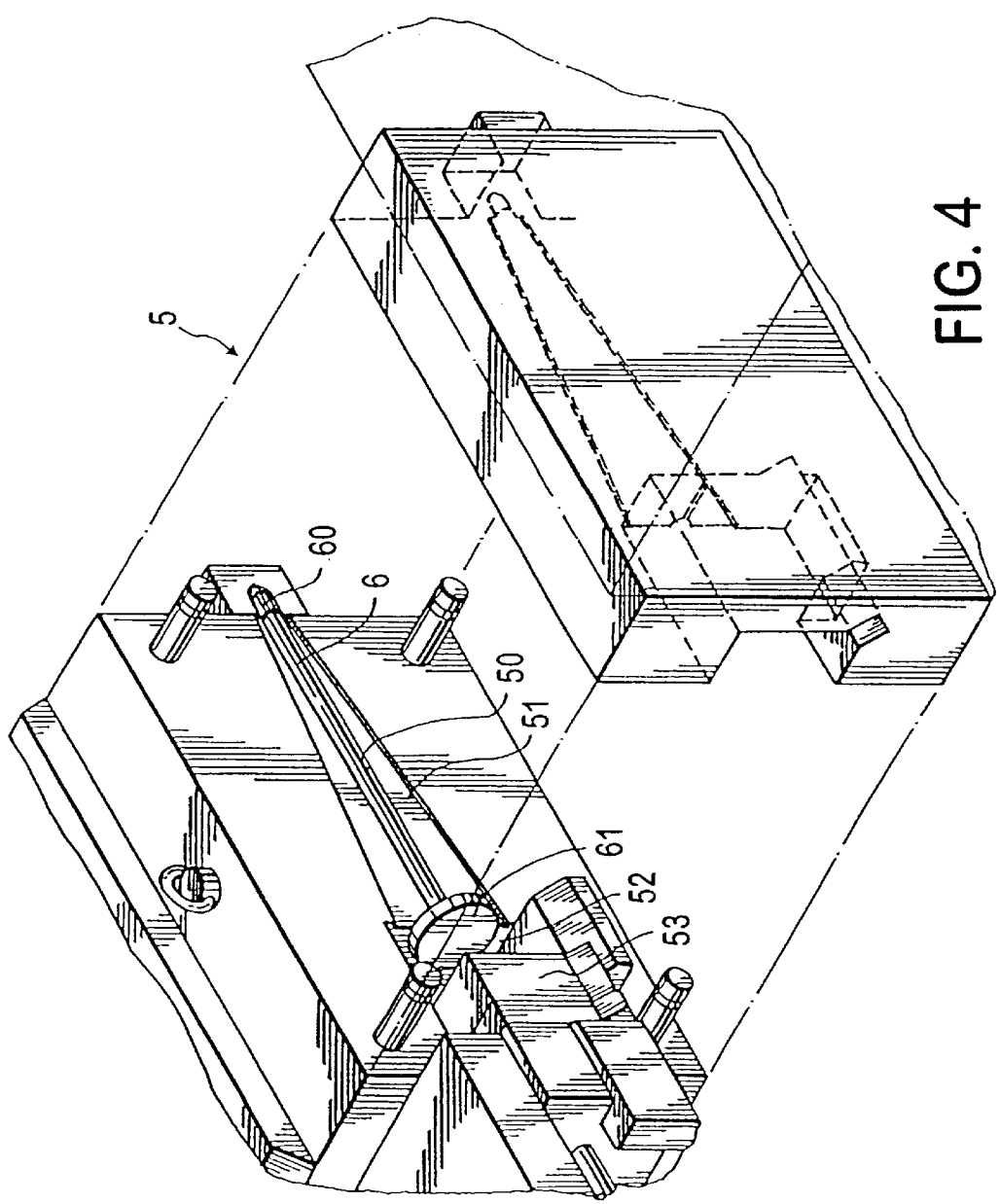
FIG. 4 is a fragmentary, exploded schematic view illustrating a metal shaft disposed in the mold of FIG. 3 when the anchor device is manufactured according to a method of the present invention.

Referring to FIGS. 3 and 4, one embodiment of an anchor device of this invention is fabricated by means of an injection molding mold 5 as described below. The mold 5 has an axial hole 50 formed along a longitudinal axis thereof, and a plurality of (in this embodiment, four) grooves 51 extending radially from the axial hole 50. Each of the grooves 51 has a radial width which increases gradually in a direction from a first end 500 to a second end 501 of the axial hole 50, and an enlarged receiving space 52 formed adjacent to the second end 501 of the axial hole 50.

Figure 5:
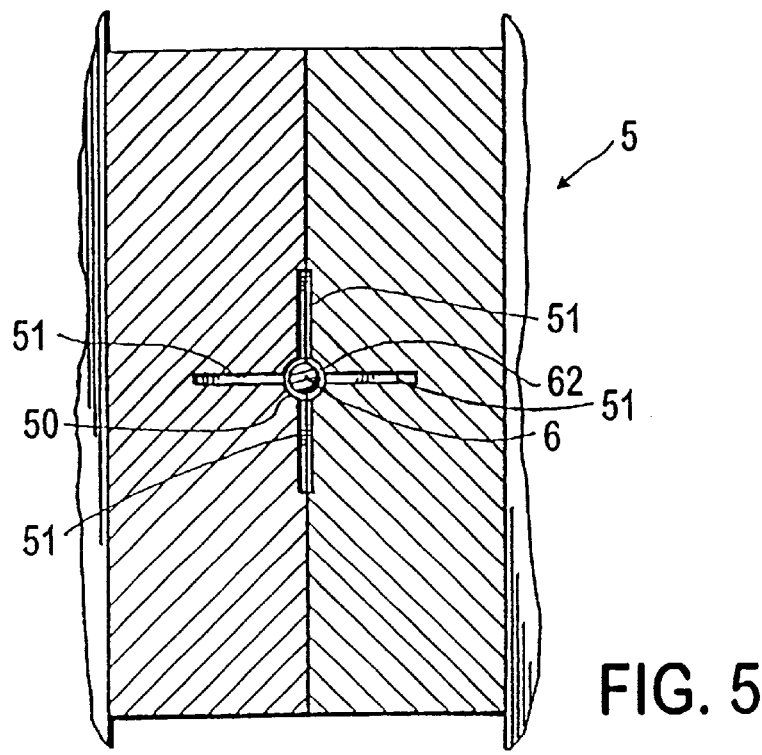
FIG. 5 is a cross-sectional view of the mold of FIG. 3 at an axial hole in which the metal shaft is disposed when the mold is in a closed position.

A metal shaft 6 is disposed in the axial hole 50 of the mold 5, as best illustrated in FIG. 4. The lower end 60 of the metal shaft 6 is tapered and extends out of the first end 500 of the axial hole 50. The upper end 61 of the metal shaft 6 is a circular head that extends into the receiving space 52 of the mold 5. An annular gap 62 is formed between the metal shaft 6 and the internal face defining the axial hole 50 of the mold 5 when the mold 5 is closed, as best illustrated in FIG. 5.

Figure 6:
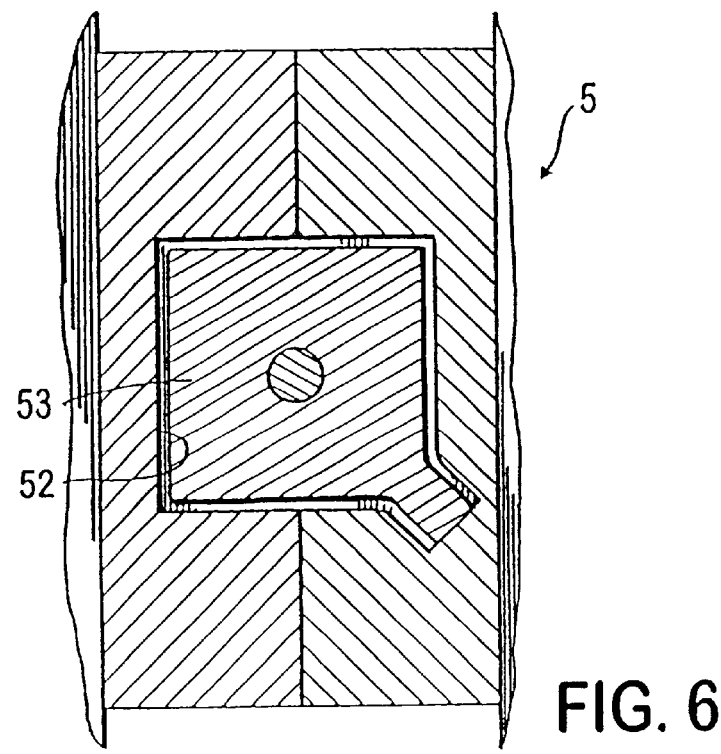
FIG. 6 is a cross sectional view of the mold of FIG. 3 at a receiving space in which a forming die is disposed when the mold is in the closed position.

A molten plastic material is injected into the annular gap 62 of the mold 5 around the metal shaft 6 in order to fill the grooves 51 and the receiving space 52. A forming die 53 is moved into the receiving space 52 of the mold 5, as best illustrated in FIG. 6, in order to depress the plastic material in the receiving space 52. After the plastic material is cooled and hardened, the forming die 53 is retracted from the receiving space 52 of the mold 5. An integrally formed anchor device 7 is thus obtained and is removed from the mold 5.

Figure 7:
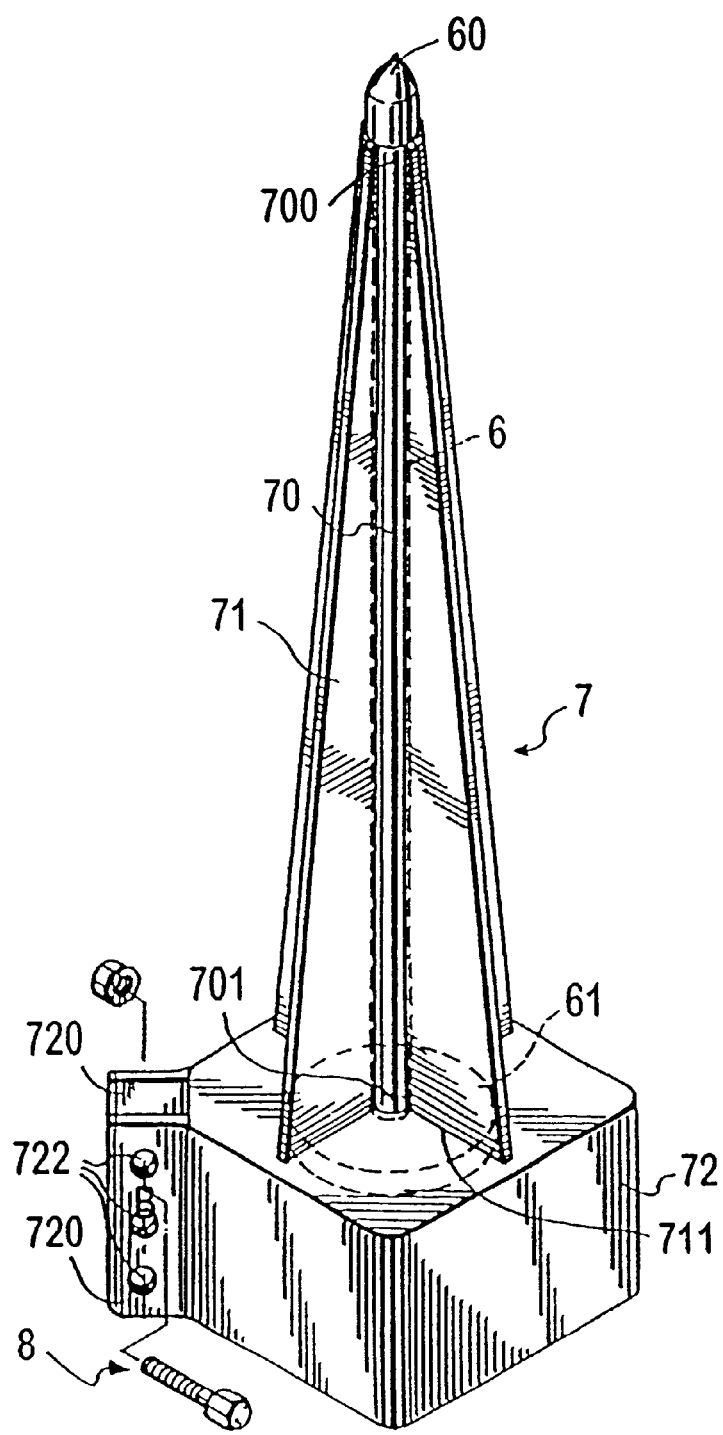
FIG. 7 is perspective view of a preferred embodiment of the anchor device having a clamping seat according to the present invention.

Referring to FIG. 7, the resulting anchor device 7 is shown to comprise an elongated insert 70 and a clamping seat 72. The insert 70 is formed as a hollow tube in the annular gap 62 of the mold 5 and has lower and upper ends 700, 701 which are formed correspondingly in the first and second ends 500, 501 of the axial hole 50 of the mold 5. A plurality of rib members 71, which are formed in the grooves 51 of the mold 5, extend radially from the insert 70. Each of the rib members 71 has a radial width which increases gradually in a direction from the lower end 700 to the upper end 701 of the insert 70.

Figure 8:
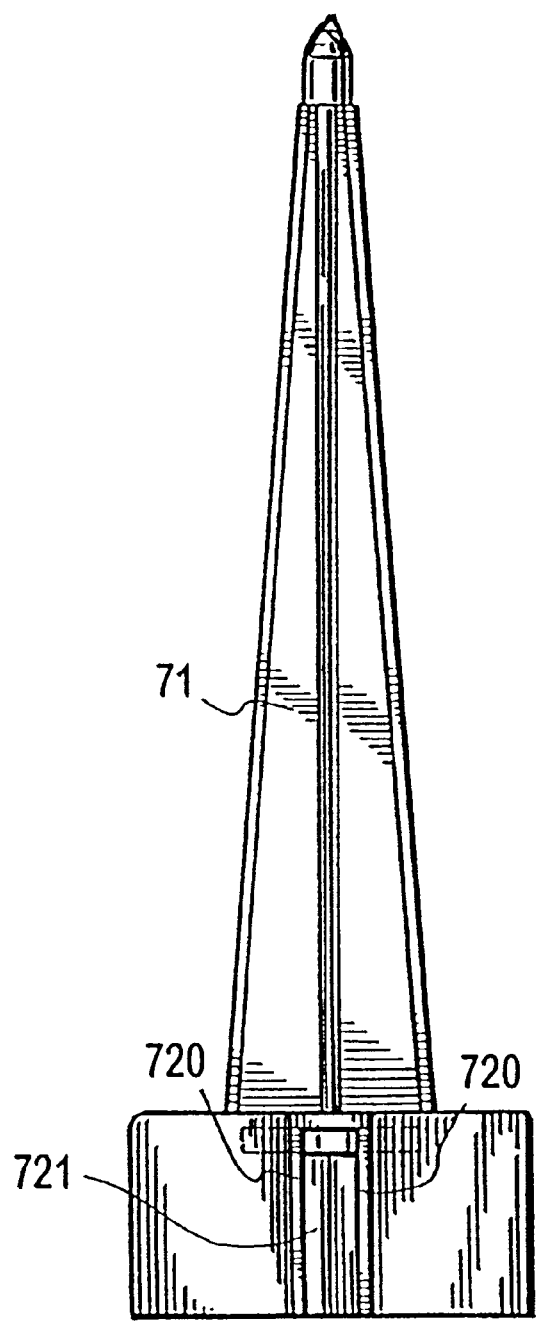
FIG. 8 is a side view of a preferred embodiment of the anchor device of FIG. 7.

The clamping seat 72, which is formed in the receiving space 52 by means of the forming die 53, is integrally connected to the upper end 701 of the insert 70 and upper edges 711 of the rib members 71. The clamping seat 72 has a generally rectangular hollow body which has notch 721 formed at a corner thereof, as best illustrated in FIG. 8, and which has a spaced pair of engaging lugs 720 that extend outwardly from the corner. The engaging lugs 720 have pairs of aligned holes 722 formed therein. A plurality of bolts and nuts 8 engage the aligned holes 722 in order to force the engaging lugs 720 toward one another when being tightened, thereby enabling the clamping seat 72 to clamp firmly a post (not shown), for example a mailbox mounting post, inserted therein.

The metal shaft 6 is embedded longitudinally in and is connected firmly to the insert 70. The circular head upper end 61 of the metal shaft 6 is embedded in the clamping seat 72, thus facilitating positioning of the center of gravity of the anchor device 7 when ramming the anchor device 7 into the ground. The tapered lower end 60 of the metal shaft 6 extends out of the lower end of the insert 70, thus facilitating the ramming action of the anchor device 7 into the ground.

Figure 9:
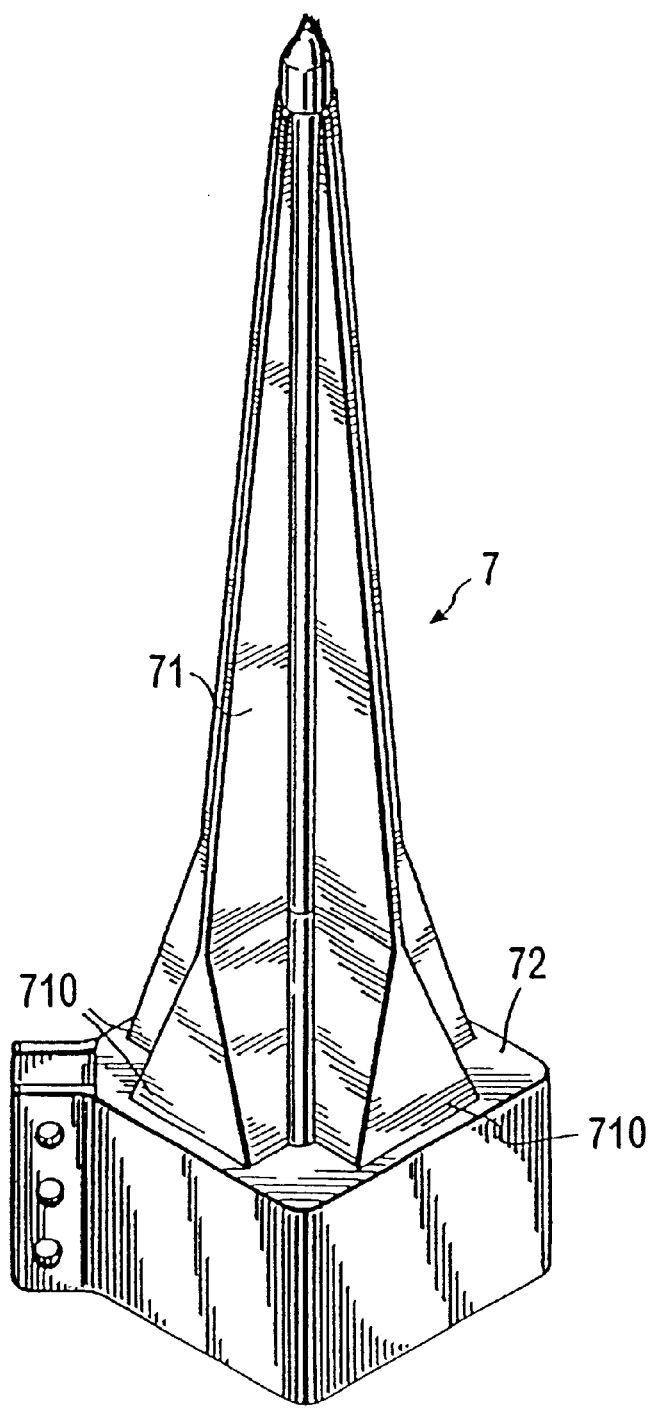
FIG. 9 is a perspective view of another preferred embodiment of the anchor device of FIG. 7, according to the present invention.

FIG. 9 shows another preferred embodiment of an anchor device according to the present invention. In this embodiment, the structure of the anchor device is similar to that of the anchor device 7 of the aforementioned embodiment, except that each of the upper edges of the rib members 71 has a thickened portion 710 formed at the juncture of a corresponding one of the rib members 71 and the clamping seat 72 in order to increase the structural strength of the rib members 71.

Figure 10:
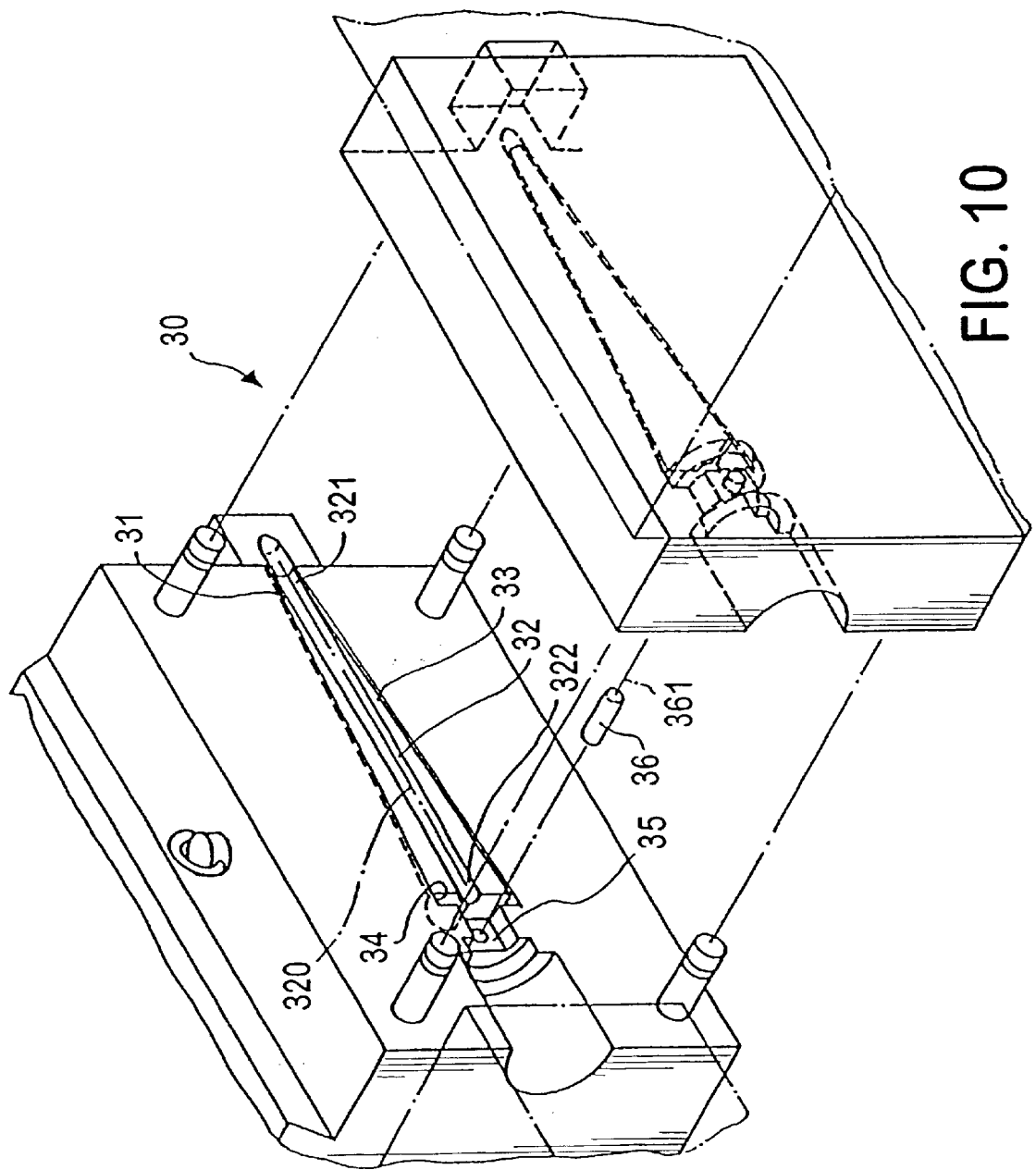
FIG. 10 is a fragmentary, exploded schematic view illustrating an elongated mold for manufacturing a preferred embodiment of the anchor device having an anchoring seat, according to a method of the present invention.
Figure 11:
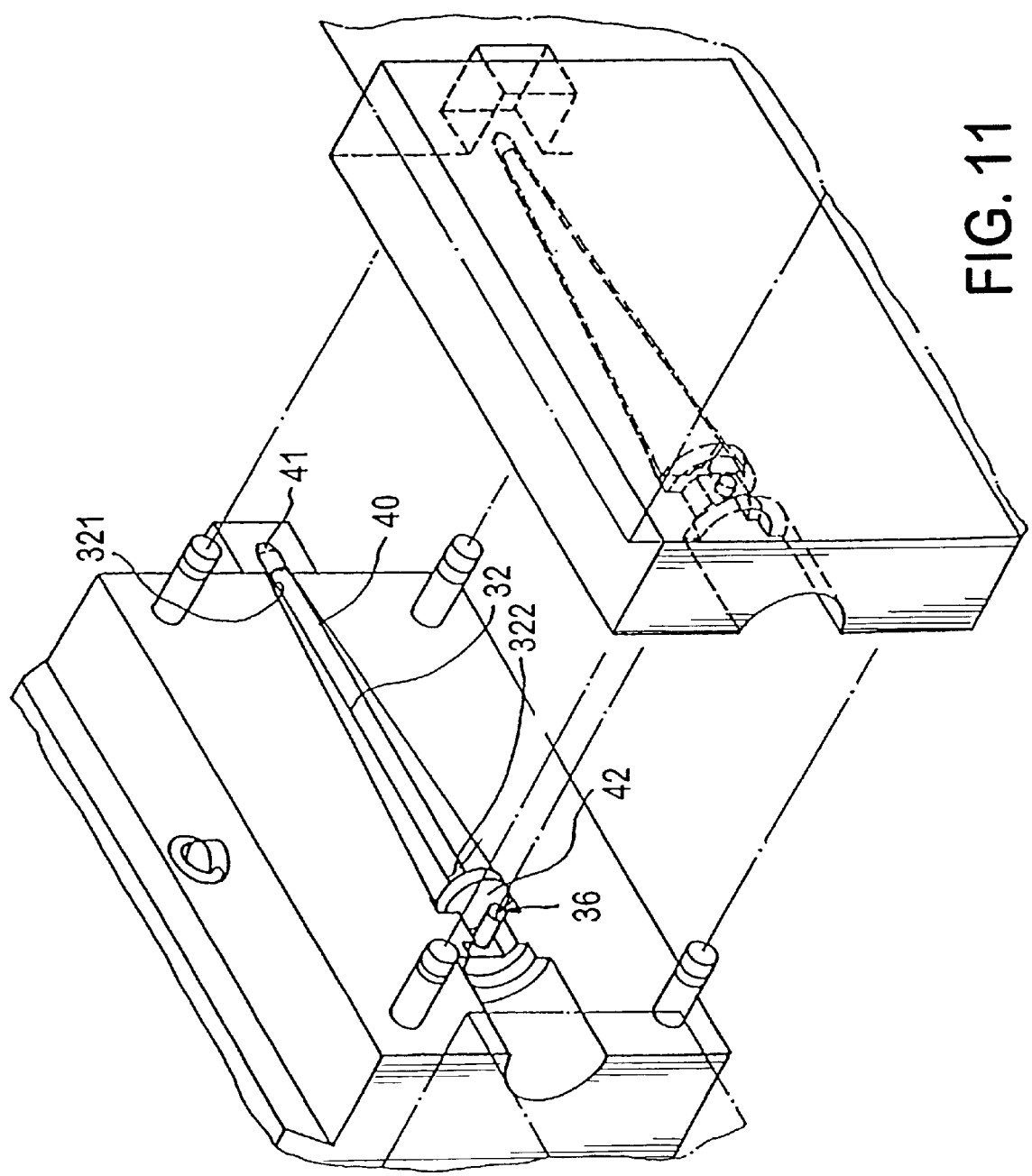
FIG. 11 is a fragmentary, exploded schematic view illustrating a metal shaft disposed in the mold of FIG. 10 when the anchor device is manufactured according to a method of the present invention.

Referring to FIGS. 10 and 11, another embodiment of an anchor device of this invention is fabricated by means of an injection molding mold 30 as described below. The mold 30 has an axial hole 32 formed along a longitudinal axis thereof, and a plurality of (in this embodiment, four) grooves 33 extending radially from the axial hole 32. Each of the grooves 33 has a radial width which increases gradually in a direction from a first end 321 to a second end 322 of the axial hole 32, and a receiving space 35 formed adjacent to the second end 322 of the axial hole 32. A shaft 36 is contained in the receiving space 35 so as to form a hole within the receiving space 35.

A metal shaft 40 is disposed in the axial hole 32 of the mold 30, as best illustrated in FIG. 11. The lower end or lower head 41 of the metal shaft 40 is tapered and extends out of the first end 321 of the axial hole 32. The upper end or upper head 42 of the metal shaft 40 is a circular head that extends into the receiving space 35 of the mold 30.

An annular gap is formed between the metal shaft 40 and the internal face defining the axial hole 32 of the mold 30 when the mold 30 is closed. A molten plastic material is injected into the annular gap of the mold 30 around the metal shaft 40 in order to fill the grooves 33 and the receiving space 35. The shaft 36 ensures that the molten plastic within the receiving space 35 has a hole formed therein, so as to form an anchoring seat. An integrally formed anchor device 50 is thus obtained and is removed from the mold 30.

Figure 12:
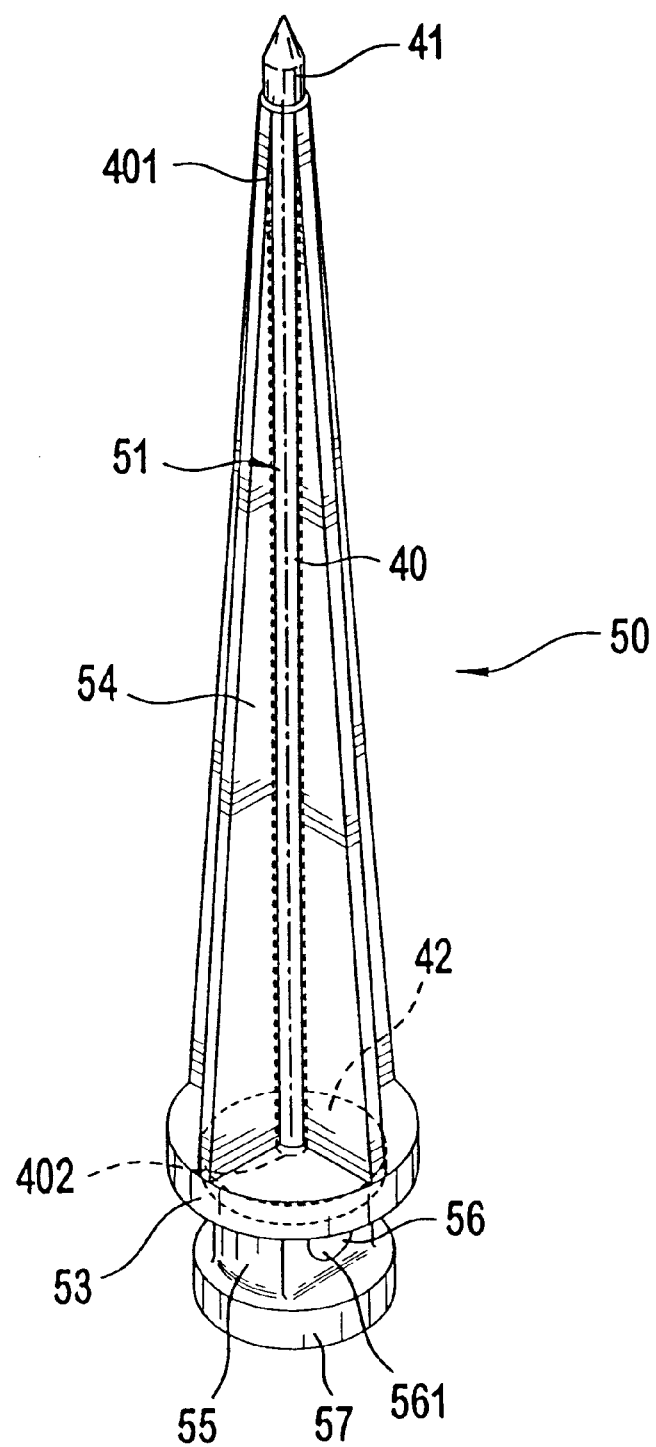
FIG. 12 is a perspective view of another preferred embodiment of an anchor device having an anchoring seat, according to the present invention.
Figure 13:
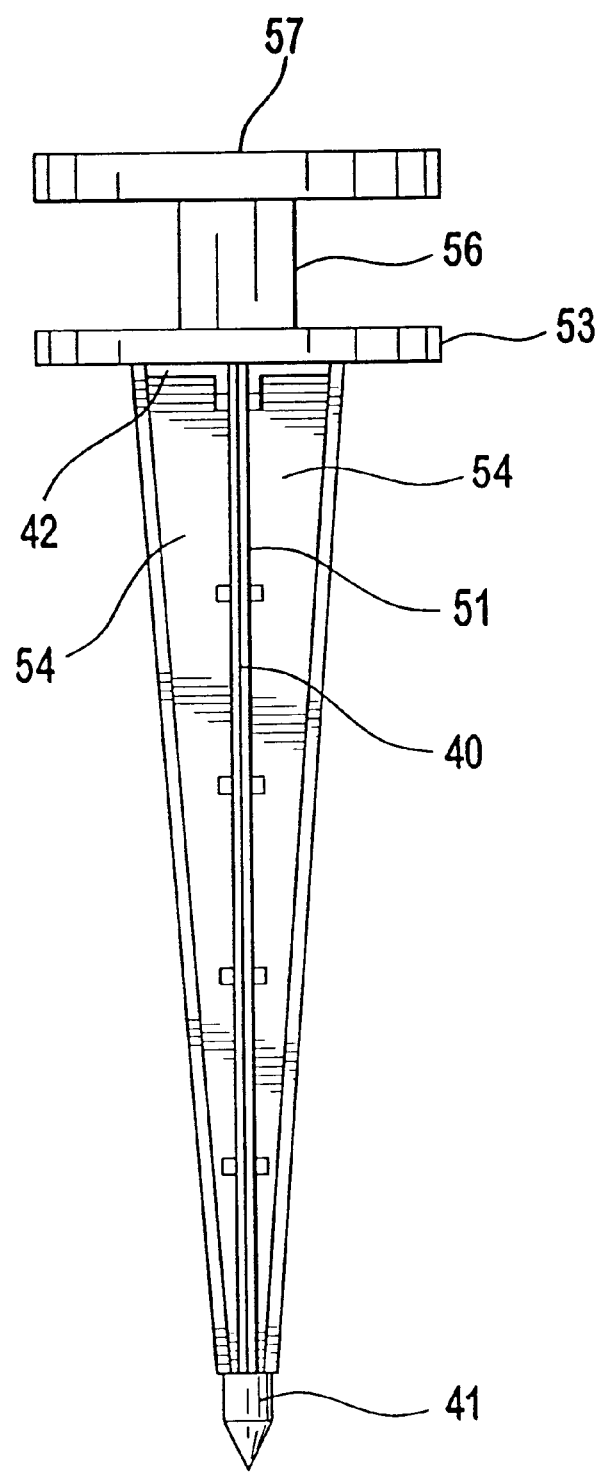
FIG. 13 is a side view of the anchor device of FIG. 12.

Referring to FIGS. 12 and 13, the resulting anchor device 50 is shown to comprise an elongated insert 51 and an anchoring seat 55. The elongated insert 51 is formed as a hollow tube in the annular gap of the mold 30 and has lower and upper ends 401, 402. A plurality of rib members 54 extend radially from the elongated insert 51. Each of the rib members 54 has a radial width which increases gradually in a direction from the lower end 401 to the upper end 402 of the insert 51.

The anchoring seat 55 is integrally connected to the upper end 402 of the insert 51 and upper edges of the rib members 54. The anchoring seat 55 has a lower circular surface 53 upon which a block 56 is formed. The block 56 preferably contains a hole 561 therein. Formed on top of the block 56 is an upper circular surface 57. As illustrated, the upper circular surface 57 is larger than the block 56 but is preferably smaller that the lower circular surface 53.

The metal shaft 40 is embedded longitudinally in and is connected firmly to the insert 51. Additionally, the circular head upper end 42 of the metal shaft 40 is embedded in lower circular surface 53 of the anchoring seat 55, thus facilitating positioning of the center of gravity of the anchor device 50 when ramming the anchor device 50 into the ground. The tapered lower end 41 of the metal shaft 40 extends out of the lower end 401 of the insert 51, thus facilitating the ramming action of the anchor device 50 into the ground.

Figure 14:
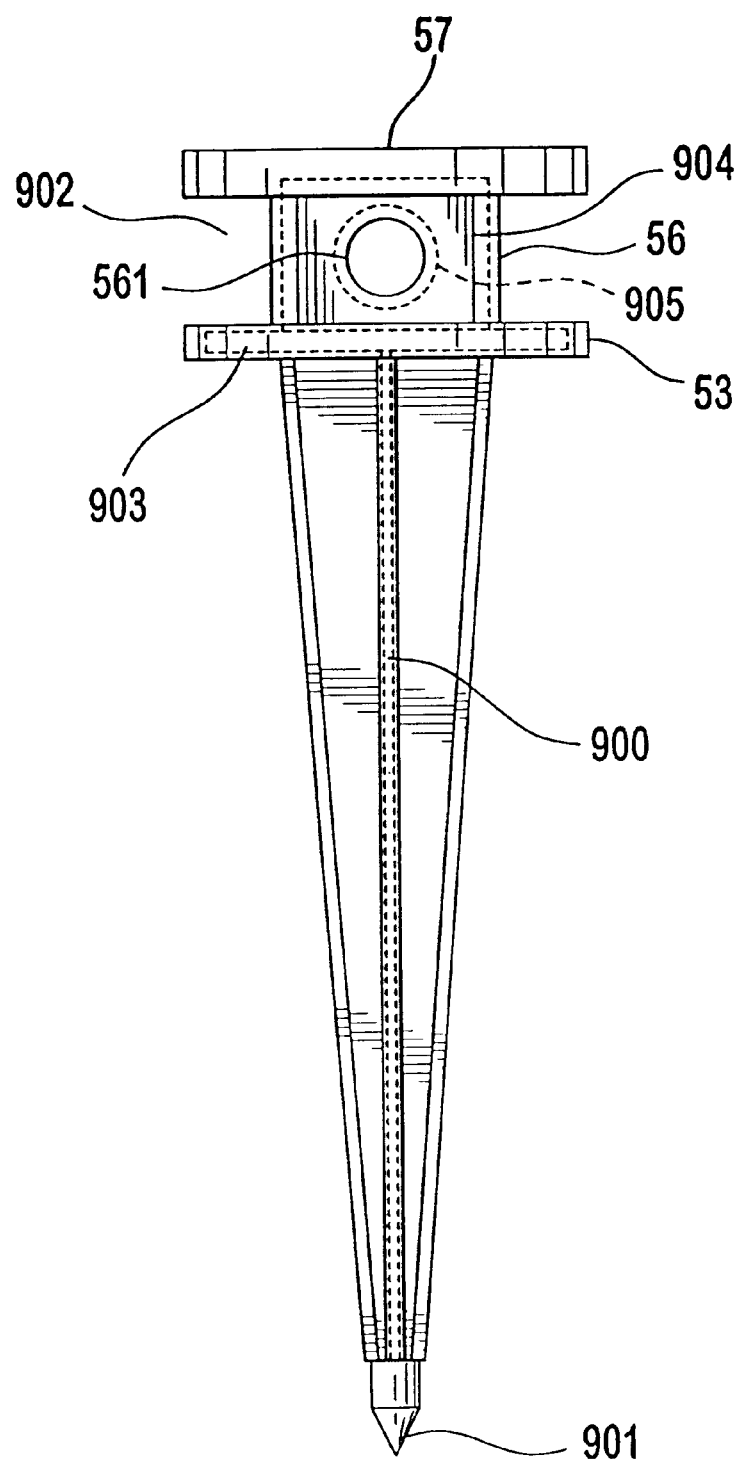
FIG. 14 is a lower view of the anchor device of FIG. 12, showing another embodiment of the metal shaft.

An alternative embodiment of the anchoring seat entails utilizing a modified metal shaft 900. The modified shaft includes a tapered lower end 901 and a head end 902. The head end includes a circular plate 903 that has a block 904 formed thereon. The block 904 preferably has a hole 905 formed therein. Utilizing this modified shaft allows the anchoring seat to be made of metal such as iron and only be coated with plastic. This embodiment is best illustrated in FIG. 14. The upper circular surface is still made of plastic so as to provide a larger surface to drive the anchor device 50 in the ground.

Advantageously, a cap (not shown), such as a plastic cap, is formed so as to fit over the upper circular surface 57. This cap is to protect the upper circular surface 57 as the anchoring device is driven into the ground.

Similarly to the embodiment depicted in FIG. 9 but not illustrated in a separate figure, the rib member 54 of the anchor device 50 may also include a thickened portion formed at the juncture of a corresponding one of the rib members 54 and the anchoring seat 55 in order to increase the structural strength of the rib members 54.

Figure 15:
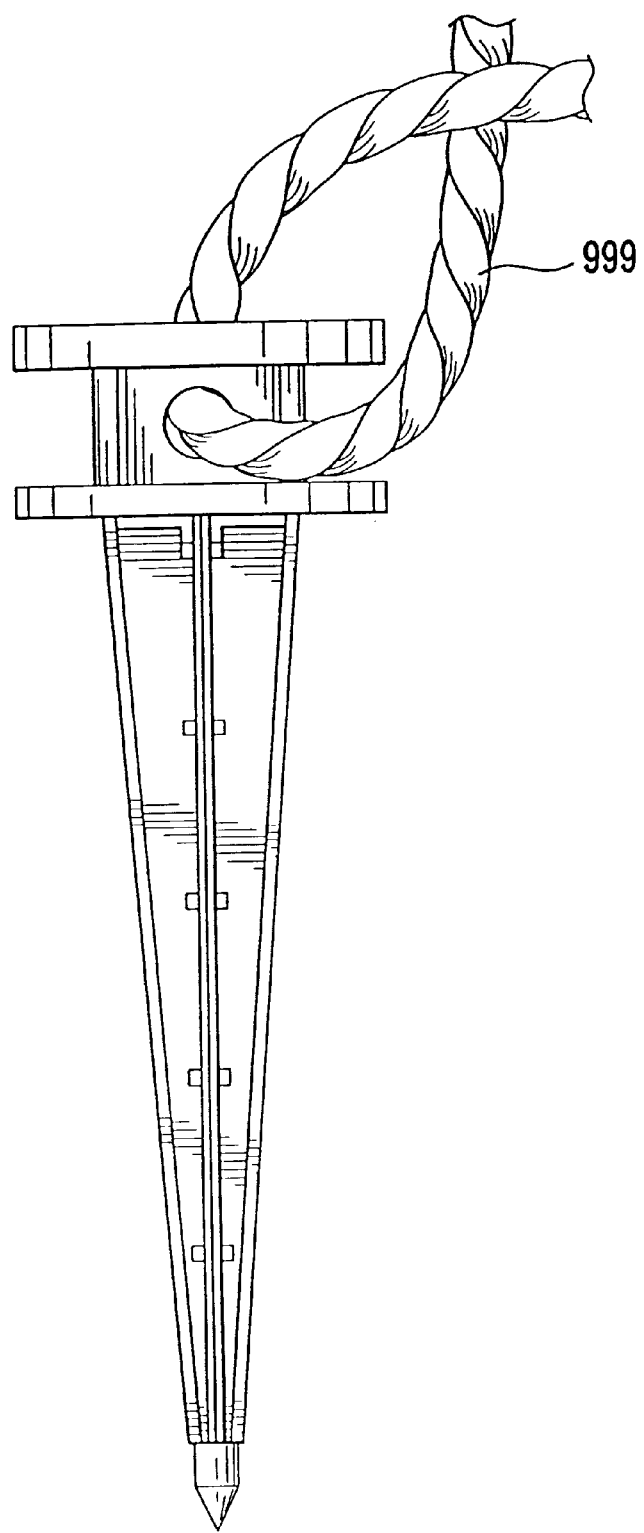
FIG. 15 is a perspective view of the anchor device of FIG. 12 illustrating how a rope can be put through the anchoring seat.

Referring to FIG. 15, a connection means 999 such as a rope; a bar, etc. may be threaded through the hole 561 and used to anchor, tie down or support various items such as tents, trees, etc. (not shown).

It should be noted that the molds of any of the embodiments described above may have clamps, rods, or other holding means to hold the metal rod in place. Thus, the anchor device will have voids where the plastic did not form because of these clamps. These holes need to be sealed in order to prevent the possibility of water getting in the anchor device and causing the metal rod to rust. The holes can be sealed with, for example, an epoxy material.

It is noted, that since the anchor device of the present invention is made of a plastic material by means of an injection molding process, the manufacturing costs of the anchor device can be reduced dramatically. In addition, rusting will not occur when the anchor device is in use, thereby improving the durability of the anchor device.

It should also be noted that the length of the elongated insert and thus the metal rod, depends on the use of the anchor device. As would be apparent to those skilled in the art the more weight that is being supported by the anchor device with the clamping seat or the more force being held in place by the anchor device with the anchor seat the longer the elongated insert and thus the metal rod will be.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangement.

What is claimed is:

1. An anchor device comprising:
   an elongated insert which is made of a plastic material and which has a lower end, an upper end, and a plurality of rib members extending radially therefrom, each of said rib members having a radial width which increases gradually in a direction from said lower end to said upper end of said elongated insert;

an attachment seat integrally connected to said upper end of said insert and upper edges of said rib members;

a metal shaft embedded longitudinally in said elongated insert, said metal shaft having an upper head embedded in said attachment seat, and a lower end with an enlarged lower head having a diameter greater than a diameter of a shaft portion of said metal shaft that extends out of said lower end of said insert; and wherein a lower end of said enlarged lower head is tapered.

2. The anchor device of claim 1, wherein each of said upper edges of said rib members has a thickened portion formed therealong.

3. The anchor device of claim 1, wherein said attachment seat has a generally rectangular hollow body.

4. The anchor device of claim 3, wherein said attachment seat as a notch formed in a corner of said hollow body and a spaced pair of engaging lugs extending outwardly from said corner, said engaging lugs having a plurality of aligned holes formed therein.

5. The anchor device of claim 4, further comprising a plurality of bolts and nuts for engaging said aligned holes.

6. The anchor device of claim 3, further comprising a clamping means for clamping a post within the attachment seat.

7. The anchor device of claim 1, wherein said attachment seat is made of plastic.

8. The anchor device of claim 1, wherein said attachment seat includes a block with a hole formed therein.

9. The anchor device of claim 8, wherein said attachment seat is metal coated with plastic.

10. The anchor device of claim 1, wherein said metal shaft includes a head and a block formed thereon.

11. The anchor device of claim 10, wherein said block has a hole formed therein.

* * * * *